United States Patent
Cheng et al.

(10) Patent No.: US 12,461,428 B2
(45) Date of Patent: Nov. 4, 2025

(54) OPTICAL ELEMENT DRIVING MECHANISM

(71) Applicant: TDK CORPORATION, Tokyo (JP)

(72) Inventors: Pai-Jui Cheng, Taoyuan (TW);
Shu-Shan Chen, Taoyuan (TW);
Hsiao-Hsin Hu, Taoyuan (TW);
Chieh-An Chang, Taoyuan (TW)

(73) Assignee: TDK CORPORATION, Tokyo (JP)

( * ) Notice: Subject to any disclaimer, the term of this patent is extended or adjusted under 35 U.S.C. 154(b) by 421 days.

(21) Appl. No.: 18/156,132

(22) Filed: Jan. 18, 2023

(65) Prior Publication Data

US 2023/0236386 A1    Jul. 27, 2023

Related U.S. Application Data

(60) Provisional application No. 63/301,836, filed on Jan. 21, 2022.

(51) Int. Cl.
| | |
|---|---|
| *G02B 7/09* | (2021.01) |
| *G02B 7/08* | (2021.01) |
| *G02B 27/64* | (2006.01) |
| *G03B 9/36* | (2021.01) |

(52) U.S. Cl.
CPC ............ *G03B 9/36* (2013.01); *G02B 7/09* (2013.01); *G02B 27/646* (2013.01)

(58) Field of Classification Search
CPC . G02B 7/021; G02B 7/08; G02B 7/09; G02B 7/10; G02B 9/62; G02B 13/001; G02B 13/0065; G02B 27/646; H04N 5/2253; H04N 5/2254; H04N 5/2257; H04N 5/23287; G03B 2205/00; G03B 2205/0007; G03B 2205/0053; G03B 2205/0069; G03B 3/02; G03B 3/10; G03B 5/00; G03B 5/04; G03B 13/36; G03B 30/00; H02K 11/21; H02K 11/33; H02K 41/0354; H02K 41/0356
USPC ....... 359/911, 554, 555, 557, 811, 813, 814, 359/824, 872, 877; 396/52, 55
See application file for complete search history.

(56) References Cited

U.S. PATENT DOCUMENTS

| | | | | |
|---|---|---|---|---|
| 12,222,576 | B2* | 2/2025 | Hu | G02B 7/1805 |
| 2006/0232169 | A1* | 10/2006 | Sasaki | H02N 2/025 |
| | | | | 310/329 |
| 2023/0161229 | A1* | 5/2023 | Kim | H04N 23/57 |
| | | | | 359/824 |
| 2024/0388783 | A1* | 11/2024 | Kim | G03B 17/12 |

* cited by examiner

*Primary Examiner* — Marin Pichler
(74) *Attorney, Agent, or Firm* — MUNCY, GEISSLER, OLDS & LOWE, P.C.

(57) ABSTRACT

An optical element driving mechanism is provided. The optical element driving mechanism includes a fixed assembly, a movable part, a driving assembly, and a coupling assembly. The movable part is configured to be connected to an optical element. The movable part is movable relative to the fixed assembly. The driving assembly is configured to drive the movable part to move relative to the fixed assembly. The movable part is movable relative to the fixed assembly by the coupling assembly.

18 Claims, 11 Drawing Sheets

OPTICAL ELEMENT DRIVING MECHANISM

CROSS REFERENCE TO RELATED APPLICATIONS

This application claims the benefit of U.S. Provisional Application No. 63/301,836, filed on Jan. 21, 2022, the entirety of which is incorporated by reference herein.

BACKGROUND OF THE INVENTION

Field of the Invention

The present disclosure relates to an optical element driving mechanism, and in particular it relates to an optical element driving mechanism with a piezoelectric element.

Description of the Related Art

As technology has developed, many of today's electronic devices (such as smartphones) are equipped with a camera and have video functionality. Using the camera modules disposed on electronic devices, users can operate their electronic devices to capture photographs and record videos.

Today's design of electronic devices continues to follow the trend of miniaturization, meaning that the various components in the camera module and its structure must also be continuously reduced, so as to achieve miniaturization. In general, a driving mechanism used in a camera module has a camera lens holder configured to hold a camera lens, and the driving mechanism can perform such functions as auto focusing or optical image stabilization. Although existing driving mechanisms can achieve the aforementioned functions of taking pictures and recording video, they still cannot meet all the needs of users.

Therefore, how to design a camera module capable of performing autofocus and optical image stabilization functions and capable of achieving miniaturization are topics nowadays that need to be discussed and solved.

BRIEF SUMMARY OF THE INVENTION

Accordingly, the present disclosure provides an optical element driving mechanism to solve the above-mentioned problems.

According to some embodiments of the disclosure, the present disclosure provides an optical element driving mechanism including a fixed assembly, a movable part, a driving assembly and a coupling assembly. The movable part is configured to be connected to an optical element, and the movable part is movable relative to the fixed assembly. The driving assembly is configured to drive the movable part to move relative to the fixed assembly. The movable part is movable relative to the fixed assembly by the coupling assembly.

According to some embodiments, the optical element driving mechanism further includes a guiding assembly configured to guide the movable part along a first axis. The guiding assembly includes a first guiding member which is affixed to the fixed assembly. The first guiding member has a long strip-shaped structure extending along the first axis. The coupling assembly includes a first elastic member and a second elastic member. The first elastic member and the second elastic member each have a plate-shaped structure. The first elastic member is affixed to the movable part.

According to some embodiments, when viewed along the first axis, the driving assembly is located between the first elastic member and the movable part. When viewed along the first axis, the first guiding member is located between the second elastic member and the movable part. When viewed along the first axis, the driving assembly and the first guiding member are located at opposite corners of the movable part.

According to some embodiments, the coupling assembly further includes a third elastic member and a fourth elastic member. The third elastic member and the fourth elastic member each have a plate-shaped structure. When viewed along the first axis, the driving assembly is located between the third elastic member and the first elastic member. The third elastic member and the first elastic member are configured to be in contact with a driving member of the driving assembly to hold the driving member. When viewed along the first axis, the first guiding member is located between the fourth elastic member and the second elastic member. The fourth elastic member and the second elastic member are configured to be in contact with the first guiding member so as to hold the first guiding member.

According to some embodiments, the first elastic member has a first width along the first axis. The second elastic member has a second width along the first axis. When viewed along a second axis or a third axis, the first width is less than the second width. The first axis is perpendicular to the second axis and the third axis.

According to some embodiments, when viewed along the first axis, the first elastic member has a first left-side portion, a first middle portion and a first right-side portion. The first middle portion is connected between the first left-side portion and the first right-side portion. The first left-side portion extends along the second axis. The first right-side portion extends along the third axis. The first left-side portion is affixed to the movable part by heat riveting. The first right-side portion is configured to be in contact with the driving member.

According to some embodiments, when viewed along the first axis, the second elastic member has a second left-side portion, a second middle portion and a second right-side portion. The second middle portion is connected between the second left-side portion and the second right-side portion. The second left-side portion extends along the second axis. The second right-side portion extends along the third axis. The second left-side portion and the second right-side portion are affixed to the movable part by heat riveting. The second middle portion is configured to be in contact with the first guiding member.

According to some embodiments, the optical element driving mechanism further includes a shock absorbing element fixedly disposed on the first right-side portion. The shock absorbing element is made of a rubber material. The fixed assembly includes a casing configured to surround the movable part. When viewed along the first axis, the shock absorbing element is located between the first right-side portion and the casing.

According to some embodiments, when viewed along the first axis, there is a first gap between the shock absorbing element and the casing. When viewed along the first axis, there is a second gap between the movable part and the casing. The first gap is equal to the second gap.

According to some embodiments, when viewed along the first axis, the third elastic member has a third left-side portion, a third middle portion and a third right-side portion. The third middle portion is connected between the third left-side portion and the third right-side portion. The third left-side portion and the third right-side portion are not parallel to the second axis or the third axis. The third left-side portion and the third right-side portion are configured to be in contact with the driving member. The third middle portion does not contact the driving member. When viewed along the first axis, the third middle portion overlaps a portion of the movable part.

According to some embodiments, when viewed along the first axis, the fourth elastic member has a fourth left-side portion, a fourth middle portion and a fourth right-side portion. The fourth middle portion is connected between the fourth left-side portion and the fourth right-side portion. The fourth left-side portion extends along the second axis. The fourth right-side portion extends along the third axis. The fourth left-side portion and the fourth right-side portion are configured to be in contact with the first guiding member. The fourth middle portion does not contact the first guiding member. When viewed along the first axis, the fourth middle portion overlaps a portion of the movable part.

According to some embodiments, the driving assembly further includes a counterweight and a piezoelectric element. The piezoelectric element is fixedly connected between the counterweight and the driving member. The fixed assembly further includes a base and a supporting frame. The supporting frame forms an accommodating groove configured to accommodate a photosensitive assembly. A photosensitive element is disposed on the photosensitive assembly and configured to receive an external light passing through the optical element.

According to some embodiments, the supporting frame further forms a central opening that communicates with the accommodating groove, and the photosensitive element is disposed in the central opening. The base is fixed between the supporting frame and the casing. The driving member passes through the base, the movable part and the casing. When viewed along the third axis, the driving member overlaps the base, the movable part and the casing. The piezoelectric element is disposed in a first accommodating space of the base. When viewed along the third axis, the counterweight is disposed in a second accommodating space of the supporting frame.

According to some embodiments, the guiding assembly further includes a second guiding member affixed to the fixed assembly. The second guiding member has a long strip-shaped structure extending along the first axis. The second guiding member passes through the movable part, the casing and the base, so as to guide the movable part to move along the first axis.

According to some embodiments, the casing is made of a plastic material. The casing forms a first glue groove, a second glue groove and a third glue groove. The first glue groove is communicated with the second glue groove and the third glue groove. The optical element driving mechanism further includes a first adhesive element disposed in the first glue groove. A portion of the first adhesive element is disposed in the second glue groove and configured to fix the driving member. A portion of the first adhesive element is disposed in the third glue groove and configured to fix the second guiding member. The optical element driving mechanism further includes a second adhesive element disposed in the first accommodating space and the second accommodating space and configured to fix the counterweight. The hardness of the first adhesive element is greater than the hardness of the second adhesive element.

According to some embodiments, the optical element driving mechanism further includes an upper cover fixedly covering the casing. The upper cover and the casing are made of metal. The upper cover is affixed to the casing by laser welding technology. The upper cover covers a portion of the casing. When viewed along the first axis, a portion of the casing does not overlap the upper cover.

According to some embodiments, a first through hole is formed on the upper cover, and a second through hole is formed on the casing. The first through hole is aligned with the second through hole. The driving member passes through the first through hole and the second through hole. The diameter of the first through hole is smaller than the diameter of the second through hole. The optical element driving mechanism further includes a first bonding element disposed in the first through hole and configured to fix the driving member.

According to some embodiments, a third through hole is formed on the upper cover, and a fourth through hole is formed on the casing. The third through hole is aligned with the fourth through hole. The first guiding member passes through the third through hole and the fourth through hole. The diameter of the third through hole is smaller than the diameter of the fourth through hole. The optical element driving mechanism further includes a second bonding element disposed in the third through hole and configured to fix the first guiding member.

According to some embodiments, the second width is at least one-third of a movable stroke of the movable part along the first axis. The fixed assembly includes a base fixedly connected to the casing. The base has an accommodating notch concaved along the first axis. The accommodating notch is configured to accommodate a portion of the second elastic member.

According to some embodiments, when viewed along the first axis, a first interval is formed between the second left-side portion and the movable part. When viewed along the first axis, a second interval is formed between the second right-side portion and the movable part. The first interval is not equal to the second interval.

The present disclosure provides an optical element driving mechanism including the driving assembly which includes the piezoelectric element and driving member, and the piezoelectric element generates vibration so that the driving member drives the movable part to move relative to the fixed assembly. The optical element driving mechanism further includes a first guiding member configured to guide the movable part. The driving member and the first guiding member are arranged at opposite corners of the movable part to avoid the movable part from tilting during movement.

Furthermore, the driving member is held by the first elastic member and the third elastic member, and the shock absorbing element is disposed on the first elastic member. The shock absorbing element can protect the first elastic member when the optical element driving mechanism is impacted, and it can also effectively reduce the noise when the driving member drives the movable part.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
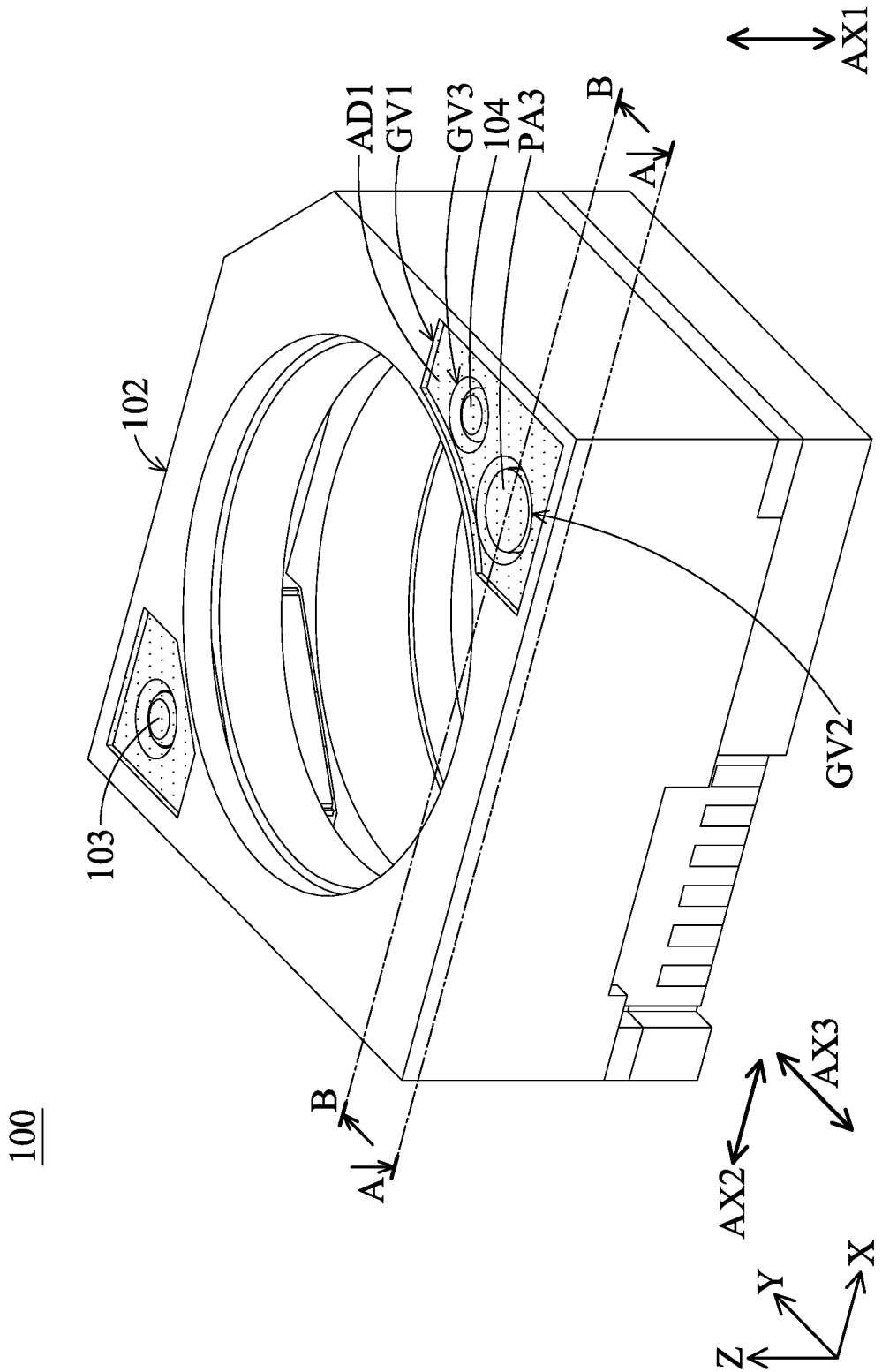
FIG. 1 is a perspective view of an optical element driving mechanism 100 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
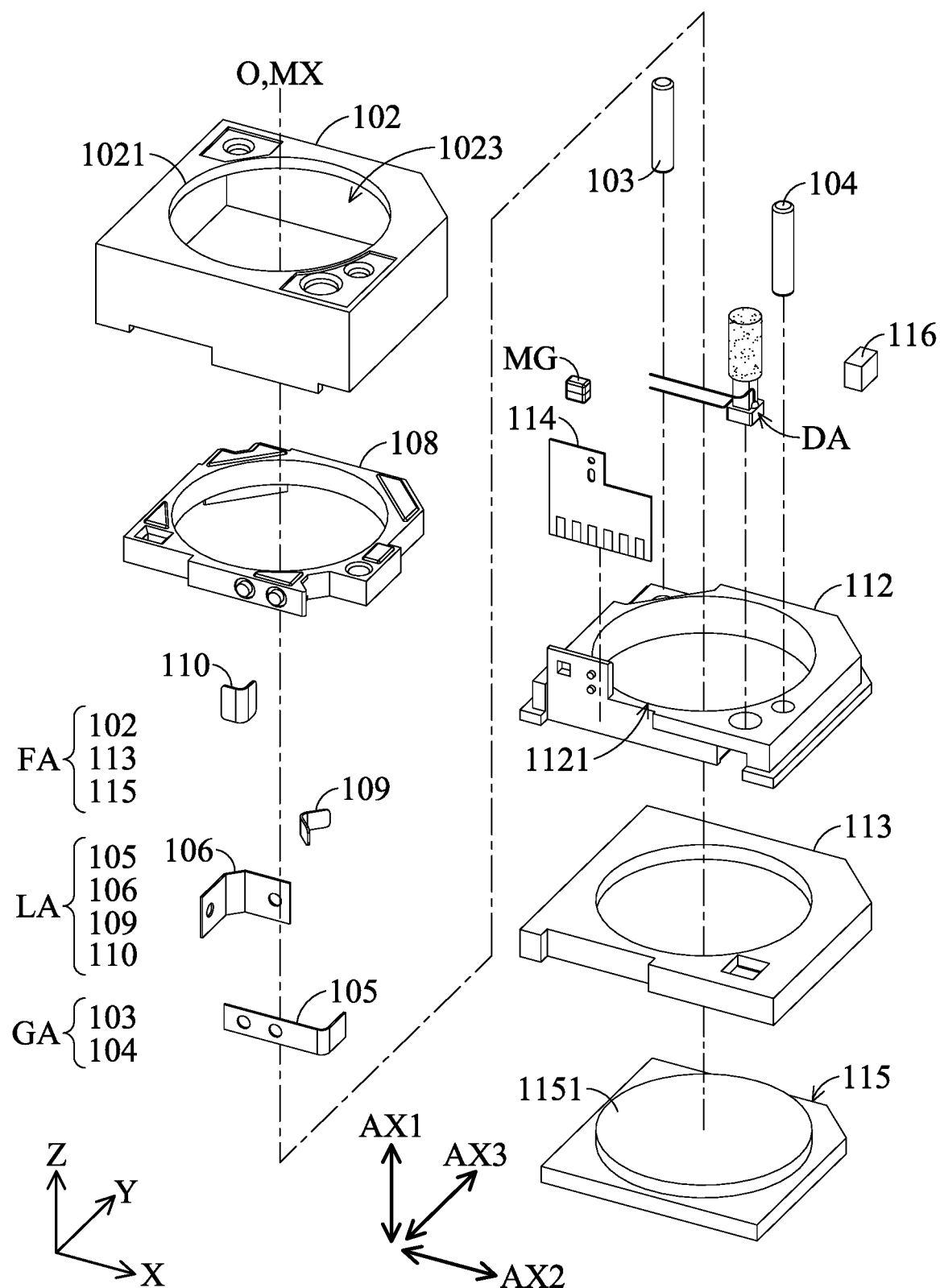
FIG. 2 is an exploded diagram of the optical element driving mechanism 100 according to an embodiment of the present disclosure.
Figure 3:
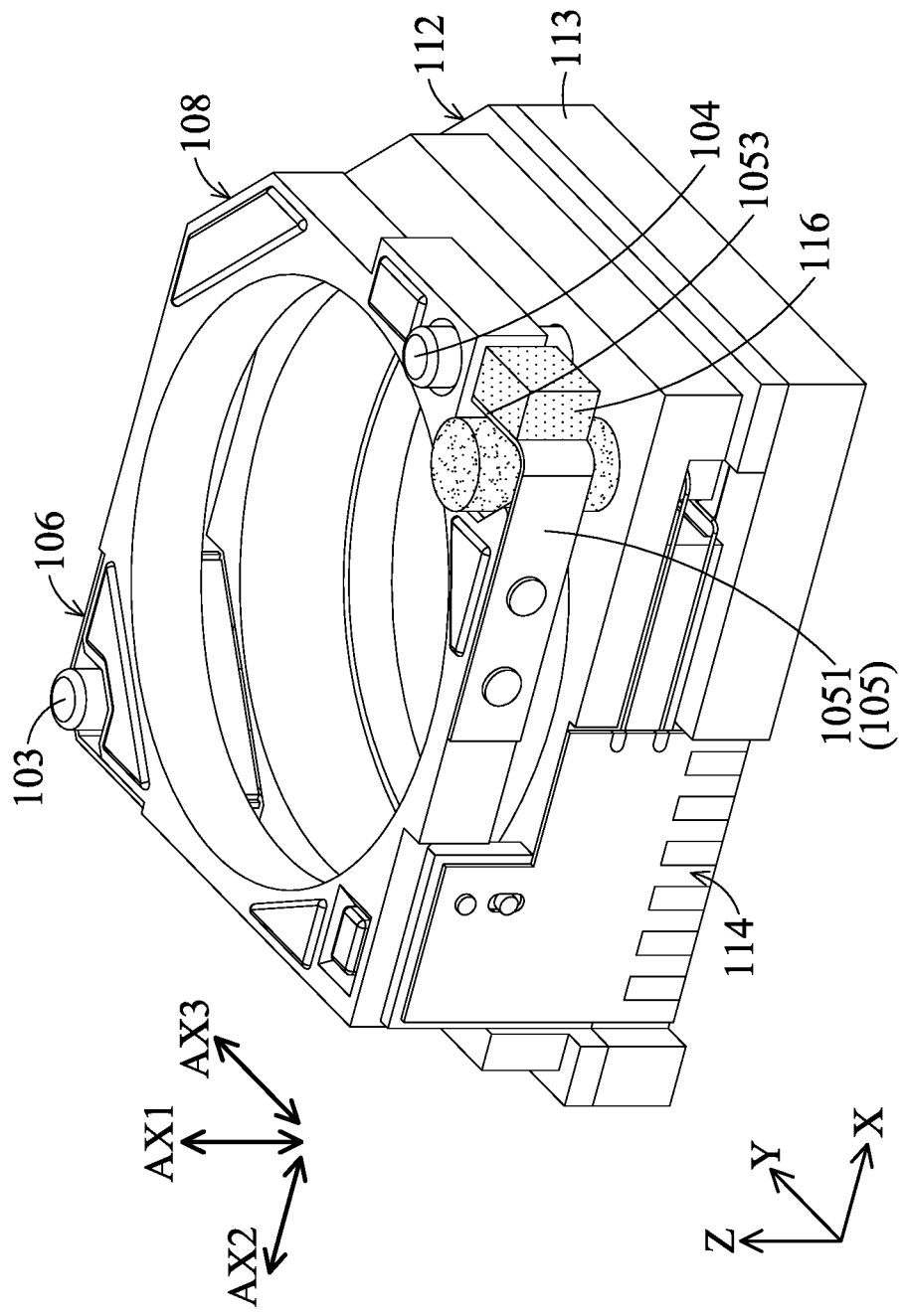
FIG. 3 is a perspective view of a partial structure of the optical element driving mechanism 100 according to an embodiment of the present disclosure.

Please refer to FIG. 1 to FIG. 3, FIG. 1 is a perspective view of an optical element driving mechanism 100 according to an embodiment of the present disclosure, FIG. 2 is an exploded diagram of the optical element driving mechanism 100 according to an embodiment of the present disclosure, and FIG. 3 is a perspective view of a partial structure of the optical element driving mechanism 100 according to an embodiment of the present disclosure. The optical element driving mechanism 100 can be an optical camera module configured to hold and drive an optical element (such as a lens, not shown in the figures). The optical element driving mechanism 100 can be installed in various electronic devices or portable electronic devices, such as smart phones, for users to perform image capturing functions. In this embodiment, the optical element driving mechanism 100 may have an auto-focus (AF) function, but the disclosure is not limited thereto. In other embodiments, the optical element driving mechanism 100 may also have the auto focus (AF) and the optical image stabilization (OIS) functions.

In this embodiment, the optical element driving mechanism 100 may include a fixed assembly FA, a movable part 108, a driving assembly DA and a coupling assembly LA. The movable part 108 is configured to be connected to an optical element (such as an optical lens, not shown in the figures). The driving assembly DA is configured to drive the movable part 108 to move relative to the fixed assembly FA, and the movable part 108 moves relative to the fixed assembly FA by the coupling assembly LA.

In this embodiment, as shown in FIG. 2, the fixed assembly FA includes a casing 102 and a base 112. The aforementioned casing 102 has a hollow structure, a casing opening 1021 is formed on the casing 102, and a base opening 1121 is formed on the base 112. The center of the casing opening 1021 is corresponding to an optical axis O of the optical element, and the base opening 1121 is corresponding to a photosensitive assembly 115 disposed below the base 112. The external light can enter the casing 102 from the casing opening 1021 and be received by the aforementioned photosensitive assembly 115 after passing through the optical element and the base opening 1121 so as to generate a digital image signal.

Furthermore, the casing 102 and the base 112 are arranged along a main axis MX, and the casing 102 is disposed on the base 112. The main axis MX is parallel to the optical axis O. The casing 102 may have an accommodating space 1023 for accommodating elements such as the movable part 108 and the driving assembly DA. For example, the optical element driving mechanism 100 further includes a circuit assembly 114 fixedly disposed on the base 112, and a part of the circuit assembly 114 is disposed in the accommodating space 1023.

In this embodiment, the optical element driving mechanism 100 further includes a guiding assembly GA configured to guide the movable part 108 to move along a first axis AX1. The guiding assembly GA includes a first guiding member 103 affixed to the fixed assembly FA. The first guiding member 103 has a long strip-shaped structure which extends along the first axis AX1.

Furthermore, the coupling assembly LA includes a first elastic member 105 and a second elastic member 106, and the first elastic member 105 and the second elastic member 106 each have a plate-shaped structure and are made of metal. The first elastic member 105 and the second elastic member 106 are affixed to the movable part 108.

Figure 4:
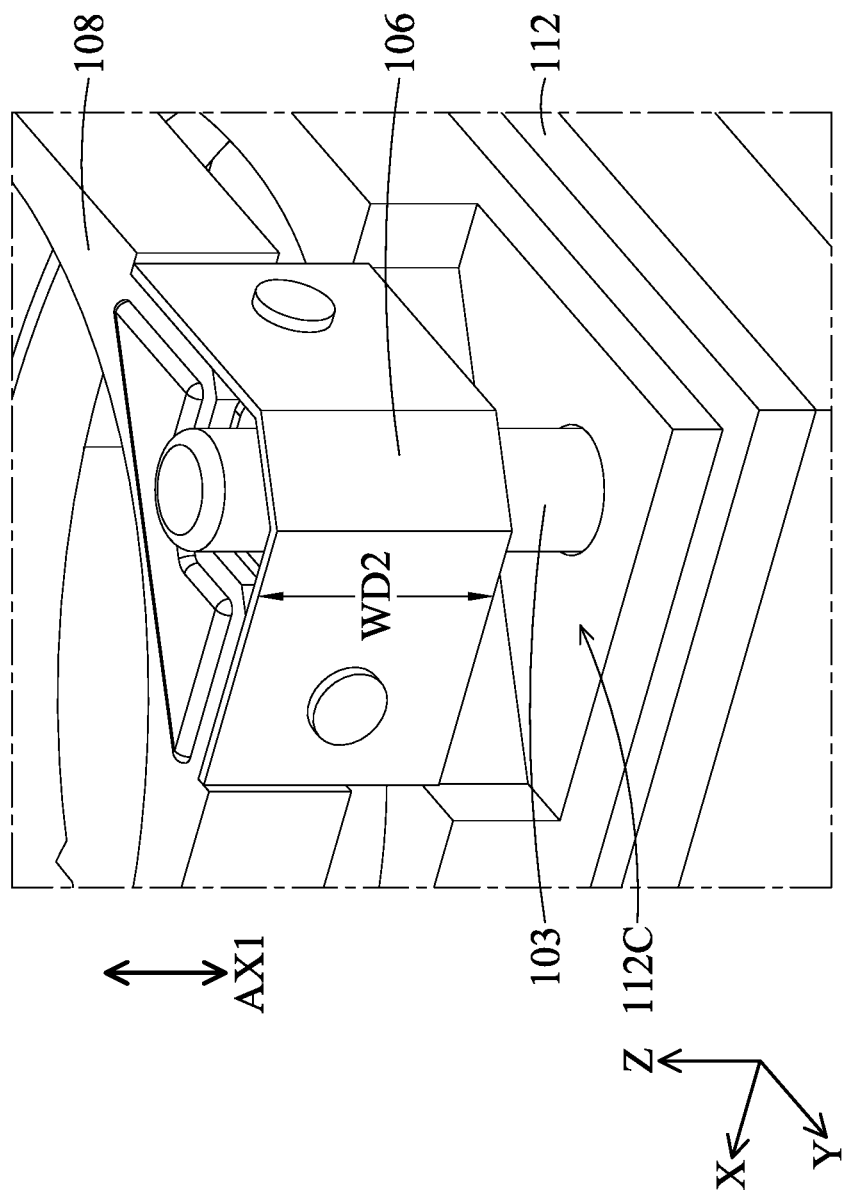
FIG. 4 is an enlarged view of a partial structure of the optical element driving mechanism 100 according to an embodiment of the present disclosure.
Figure 5:
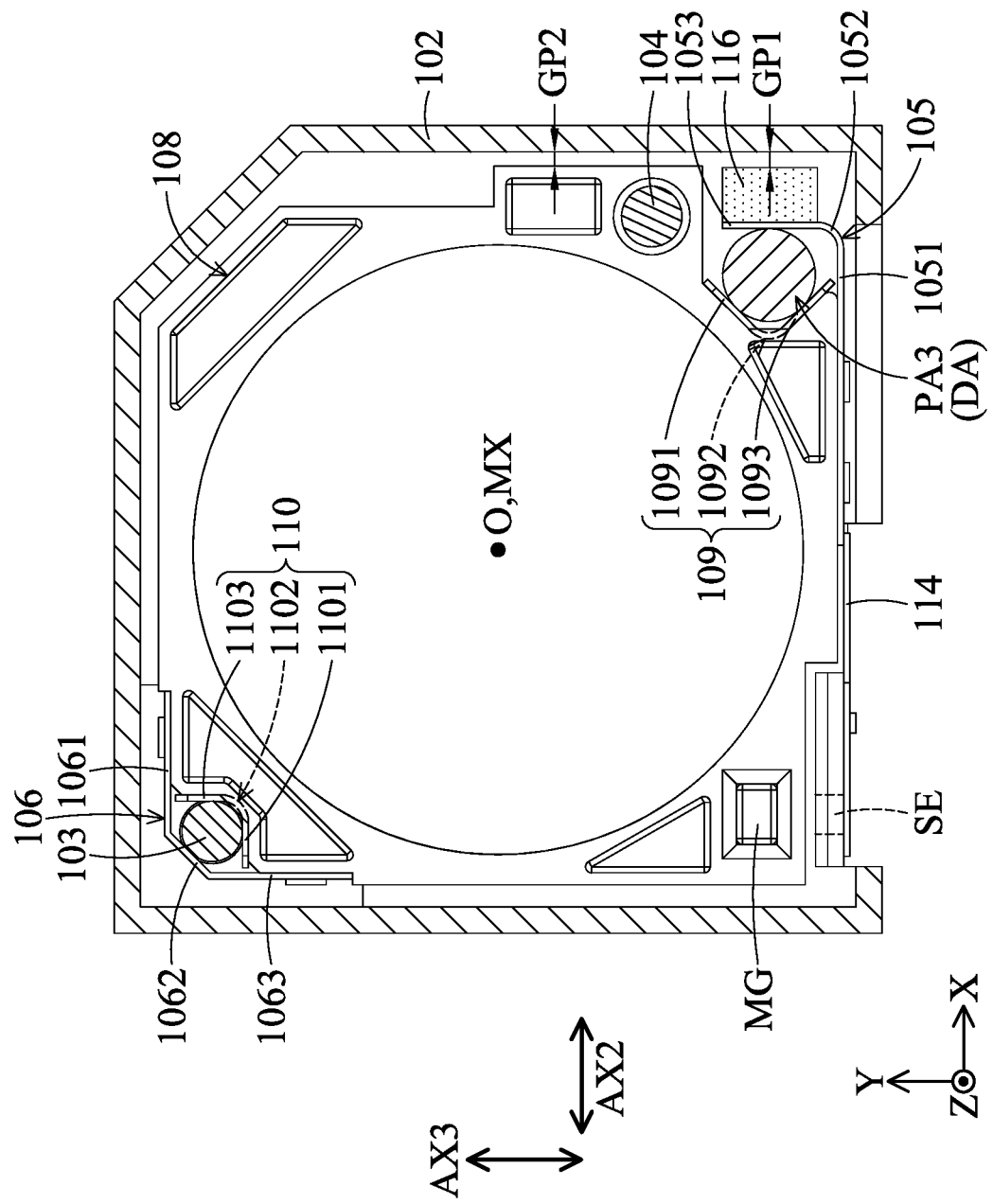
FIG. 5 is a cross-sectional view of the optical element driving mechanism 100 along line A-A in FIG. 1 according to an embodiment of the present disclosure.

Then please refer to FIG. 1 to FIG. 5. FIG. 4 is an enlarged view of a partial structure of the optical element driving mechanism 100 according to an embodiment of the present disclosure, and FIG. 5 is a cross-sectional view of the optical element driving mechanism 100 along line A-A in FIG. 1 according to an embodiment of the present disclosure. When viewed along the first axis AX1 (parallel to the optical axis O), the driving assembly DA is located between the first elastic member 105 and the movable part 108.

Moreover, when viewed along the first axis AX1, the first guiding member 103 is located between the second elastic member 106 and the movable part 108. When viewed along the first axis AX1, the driving assembly DA and the first guiding member 103 are located at opposite corners of the movable part 108. For example, when viewed along the first axis AX1, the connecting line between the center of the driving assembly DA and the center of the first guiding member 103 pass through the optical axis O.

In addition, the coupling assembly LA further includes a third elastic member 109 and a fourth elastic member 110, and the third elastic member 109 and the fourth elastic member 110 each have a plate-shaped structure and are made of metal.

As shown in FIG. 5, when viewed along the first axis AX1, the driving assembly DA is located between the third elastic member 109 and the first elastic member 105. The third elastic member 109 and the first elastic member 105 are configured to be in contact with a driving member PA3 of the driving assembly DA, so as to hold the driving member PA3.

Similarly, when viewed along the first axis AX1, the first guiding member 103 is located between the fourth elastic member 110 and the second elastic member 106. The fourth elastic member 110 and the second elastic member 106 are configured to be in contact with the first guiding member 103 so as to hold the first guiding member 103.

When viewed along the first axis AX1, the first elastic member 105 has a first left-side portion 1051, a first middle portion 1052 and a first right-side portion 1053, and the first middle portion 1052 is connected between the first left-side portion 1051 and the first right-side portion 1053.

The first left-side portion 1051 extends along a second axis AX2, and the first right-side portion 1053 extends along a third axis AX3. The first axis AX1 is perpendicular to the second axis AX2 and the third axis AX3. As shown in FIG. 3 and FIG. 5, the first left-side portion 1051 is affixed to the movable part 108 by heat riveting, and the first right-side portion 1053 is configured to be in contact with the driving member PA3.

Similarly, when viewed along the first axis AX1, the second elastic member 106 has a second left-side portion 1061, a second middle portion 1062, and a second right-side portion 1063, and the second middle portion 1062 is connected between the second left-side portion 1061 and the second right-side portion 1063.

The second left-side portion 1061 extends along the second axis AX2, and the second right-side portion 1063 extends along the third axis AX3. The second left-side portion 1061 and the second right-side portion 1063 are affixed to the movable part 108 by heat riveting, and the second middle portion 1062 is configured to be in contact with the first guiding member 103.

Furthermore, in this embodiment, the optical element driving mechanism 100 further includes a shock absorbing element 116 fixedly disposed on the first right-side portion 1053. In this embodiment, the shock absorbing element 116 is made of rubber material, but it is not limited thereto.

As shown in FIG. 5, the casing 102 is configured to surround the movable part 108. When viewed along the first axis AX1, the shock absorbing element 116 is located between the first right-side portion 1053 and the casing 102.

When viewed along the first axis AX1, there is a first gap GP1 between the shock absorbing element 116 and the casing 102, and when viewed along the first axis AX1, there is a second gap GP2 between the movable part 108 and the casing 102. It is worth noting that the first gap GP1 is equal to the second gap GP2.

Based on the structural configuration, when the optical element driving mechanism 100 is impacted, the movable part 108 and the shock absorbing element 116 can be in contact with the casing 102, thereby preventing the first elastic member 105 from colliding with the casing 102, causing the damage of the first elastic member 105.

In addition, in this embodiment, as shown in FIG. 5, when viewed along the first axis AX1, the third elastic member 109 has a third left-side portion 1091, a third middle portion 1092 and a third right-side portion 1093, and the third middle portion 1092 is connected between the third left-side portion 1091 and the third right-side portion 1093.

The third left-side portion 1091 and the third right-side portion 1093 are not parallel to the second axis AX2 or the third axis AX3. The third left-side portion 1091 and the third right-side portion 1093 are configured to be in contact with the driving member PA3, and the third middle portion 1092 does not contact the driving member PA3.

It should be noted that when viewed along the first axis AX1, the third middle portion 1092 overlaps a portion of the movable part 108. Based on this design, the overall volume of the optical element driving mechanism 100 can be reduced, thereby achieving the purpose of miniaturization.

Similarly, when viewed along the first axis AX1, the fourth elastic member 110 has a fourth left-side portion 1101, a fourth middle portion 1102 and a fourth right-side portion 1103, and the fourth middle portion 1102 is connected between the fourth left-side portion 1101 and the fourth right-side portion 1103.

The fourth left-side portion 1101 extends along the second axis AX2, the fourth right-side portion 1103 extends along the third axis AX3, the fourth left-side portion 1101 and the fourth right-side portion 1103 are configured to be in contact with the first guiding member 103, and the fourth middle portion 1102 does not contact the first guiding member 103.

Similarly, when viewed along the first axis AX1, the fourth middle portion 1102 overlaps a portion of the movable part 108. Based on this design, the overall volume of the optical element driving mechanism 100 can be further reduced, thereby achieving the purpose of miniaturization.

In addition, as shown in FIG. 5, the optical element driving mechanism 100 further includes a sensing element SE and a sensing magnet MG which are configured to sense the position of the movable part 108 relative to the base 112. In this embodiment, the sensing element SE is fixedly disposed on the circuit assembly 114, and the sensing magnet MG is embedded in a position of the movable part 108 corresponding to the sensing element SE. The sensing element SE can be, for example, a Hall sensor, but is not limited thereto.

Figure 6:
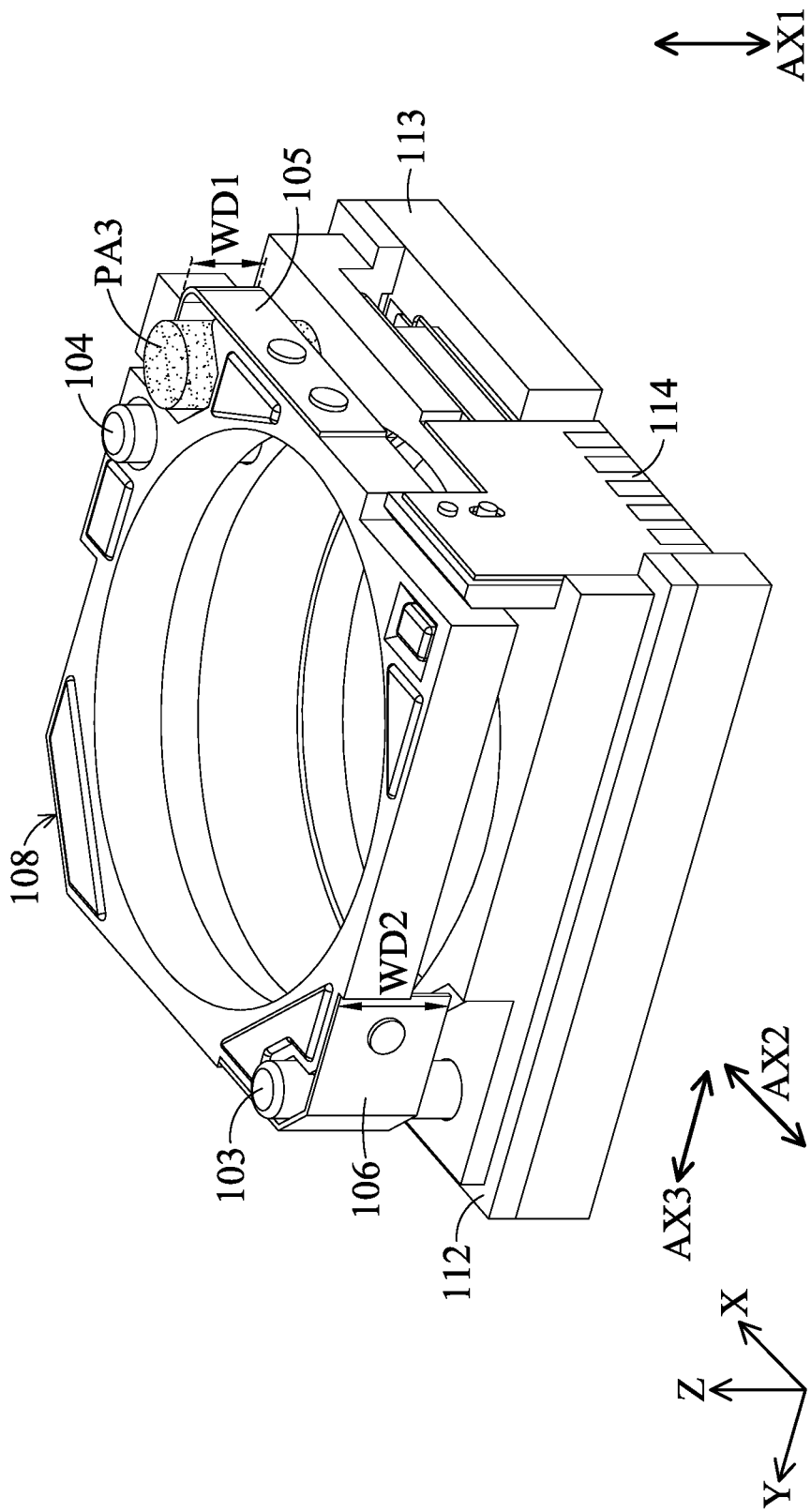
FIG. 6 is a perspective view of a partial structure of the optical element driving mechanism 100 in another view according to an embodiment of the present disclosure.

Then please refer to FIG. 4 and FIG. 6. FIG. 6 is a perspective view of a partial structure of the optical element driving mechanism 100 in another view according to an embodiment of the present disclosure. As shown in FIG. 6, the first elastic member 105 has a first width WD1 along the first axis AX1, and the second elastic member 106 has a second width WD2 along the first axis AX1.

When viewed along the second axis AX2 or the third axis AX3, the first width WD1 is smaller than the second width WD2, and as shown in FIG. 4, the second width WD2 is at least one-third of a movable stroke of the movable part 108 along the first axis AX1. The movable stroke may be the maximum moving distance of the movable part 108 along the first axis AX1.

Moreover, as shown in FIG. 4, the base 112 may have an accommodating notch 112C concaved along the first axis AX1, and the accommodating notch 112C is configured to accommodate a portion of the second elastic member 106. Based on the above structural configuration, the second width WD2 of the second elastic member 106 can be increased, thereby increasing the stability of the movable part 108 when moving along the first axis AX1, and avoiding the movable part 108 from tilting.

Figure 7:
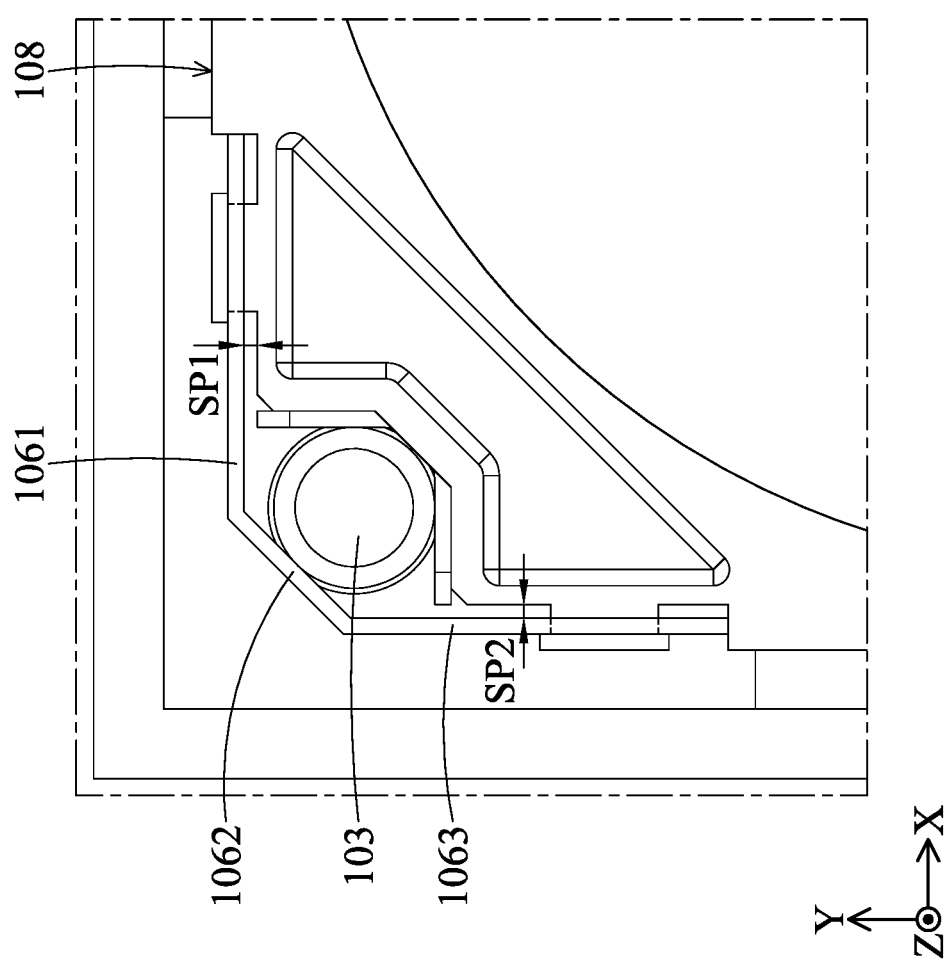
FIG. 7 is an enlarged view of a partial structure of the optical element driving mechanism 100 according to an embodiment of the present disclosure.

Please refer to FIG. 7, which is an enlarged view of a partial structure of the optical element driving mechanism 100 according to an embodiment of the present disclosure. In this embodiment, when viewed along the first axis AX1, a first interval SP1 is formed between the second left-side portion 1061 and the movable part 108. When viewed along the first axis AX1, a second interval SP2 is formed between the second right-side portion 1063 and the movable part 108.

The first interval SP1 may not be equal to the second interval SP2, but it is not limited thereto. In other embodiments, the first interval SP1 may be equal to the second interval SP2. Based on the above structural design, the interval between the second elastic member 106 and the movable part 108 can be adjusted according to actual needs, so as to achieve the best effect of holding the first guiding member 103.

Figure 8:
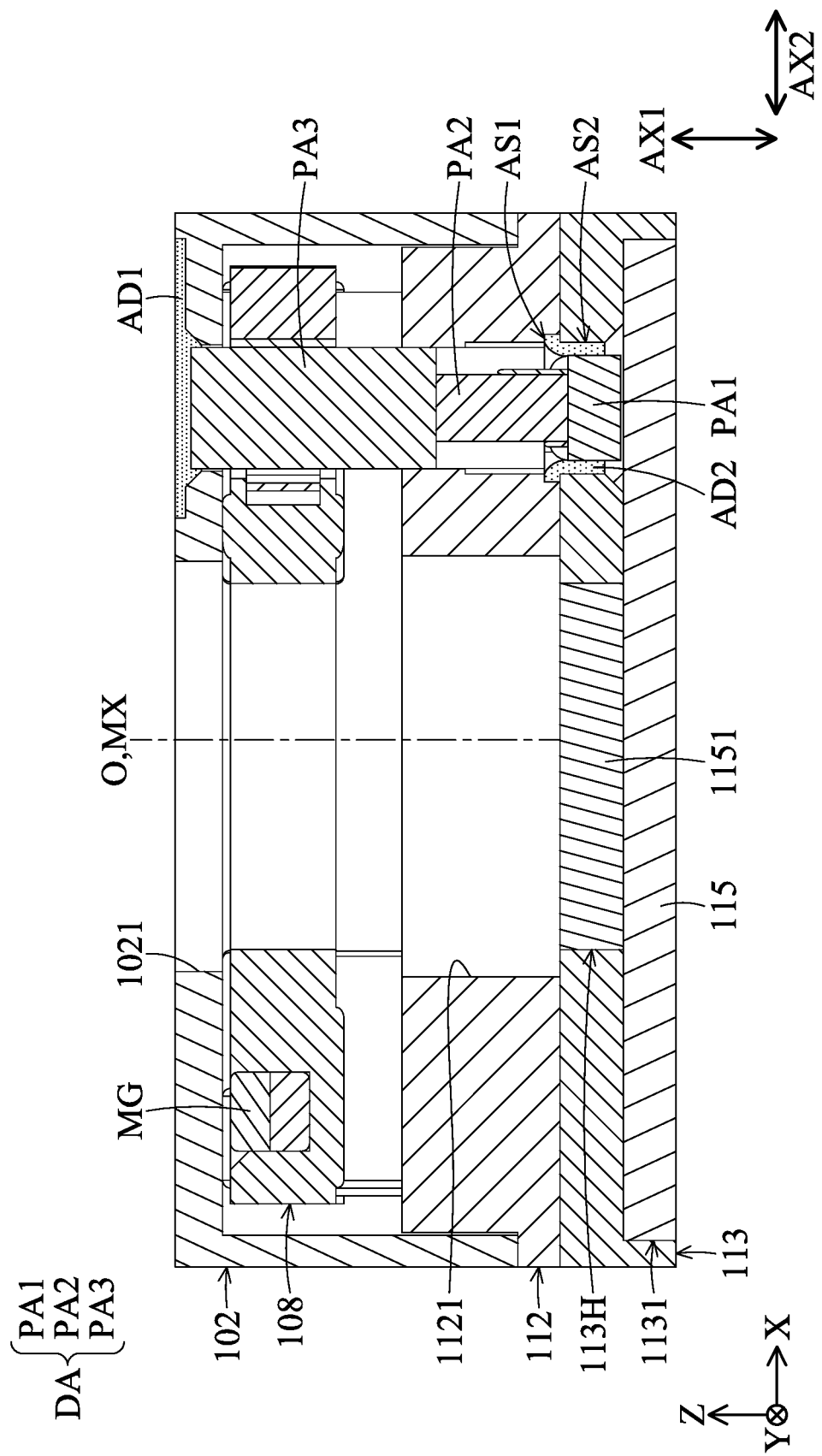
FIG. 8 is a cross-sectional view of the optical element driving mechanism 100 along line B-B in FIG. 1 according to an embodiment of the present disclosure.

Then please refer to FIG. 2 and FIG. 8. FIG. 8 is a cross-sectional view of the optical element driving mechanism 100 along line B-B in FIG. 1 according to an embodiment of the present disclosure. The driving assembly DA further includes a counterweight PA1 and a piezoelectric element PA2, and the piezoelectric element PA2 is fixedly connected between the counterweight PA1 and the driving member PA3. In this embodiment, the piezoelectric element PA2 is made of a ceramic material, and the driving member PA3 is made of a carbon material, but they are not limited thereto.

In this embodiment, the fixed assembly FA further includes a supporting frame 113, and the supporting frame 113 forms an accommodating groove 1131 configured to accommodate the aforementioned photosensitive assembly 115. The photosensitive assembly 115 is, for example, a circuit board on which a photosensitive element 1151 is disposed, and the photosensitive element 1151 is configured to receive an external light passing through the optical element so as to generate a digital image.

As shown in FIG. 8, the supporting frame 113 can further form a central opening 113H, which is communicated with the accommodating groove 1131, and the photosensitive element 1151 is disposed in the central opening 113H. It is worth noting that base 112 is fixed between the supporting frame 113 and the casing 102, and the driving member PA3 passes through the base 112, the movable part 108 and the casing 102.

As shown in FIG. 8, when viewed along the third axis AX3, the driving member PA3 overlaps the base 112, the movable part 108 and the casing 102. When viewed along the third axis AX3, the piezoelectric element PA2 is located in a first accommodating space AS1 of the base 112. When viewed along the third axis AX3, the counterweight PA1 is disposed in a second accommodating space AS2 of the supporting frame 113. Based on such a structural design, the height of the optical element driving mechanism 100 along the first axis AX1 can be reduced, thereby achieving the purpose of overall miniaturization.

Moreover, as shown in FIG. 1, FIG. 2, FIG. 3 and FIG. 5, the guiding assembly GA may further include a second guiding member 104 affixed to the fixed assembly FA. The second guiding member 104 has a long strip-shaped structure extending along the first axis AX1. The second guiding member 104 passes through the movable part 108, the casing 102 and the base 112, so as to guide the movable part 108 to move along the first axis AX1.

As shown in FIG. 1, the casing 102 can be made of a plastic material, and a first glue groove GV1, a second glue groove GV2 and a third glue groove GV3 can be formed on the casing 102, and the first glue groove GV1 is communicated with the second glue groove GV2 and the third glue groove GV3. The optical element driving mechanism 100 may further include a first adhesive element AD1 disposed in the first glue groove GV1.

It is worth noting that a portion of the first adhesive element AD1 will be disposed in the second glue groove GV2 and configured to fix the driving member PA3, and a portion of the first adhesive element AD1 will be disposed in the third glue groove GV3 and configured to fix the second guiding member 104.

Similarly, as shown in FIG. 8, the optical element driving mechanism 100 may further include a second adhesive element AD2 disposed in the first accommodating space AS1 and the second accommodating space AS2 and configured to fix the counterweight PA1. It should be noted that the first adhesive element AD1 and the second adhesive element AD2 can be glue, and the hardness of the first adhesive element AD1 is greater than the hardness of the second adhesive element AD2.

Based on the elements and structural configuration, it can be ensured that when the optical element driving mechanism 100 is impacted, the counterweight PA1, piezoelectric element PA2 and driving member PA3 can all be well protected and not damaged.

Figure 9:
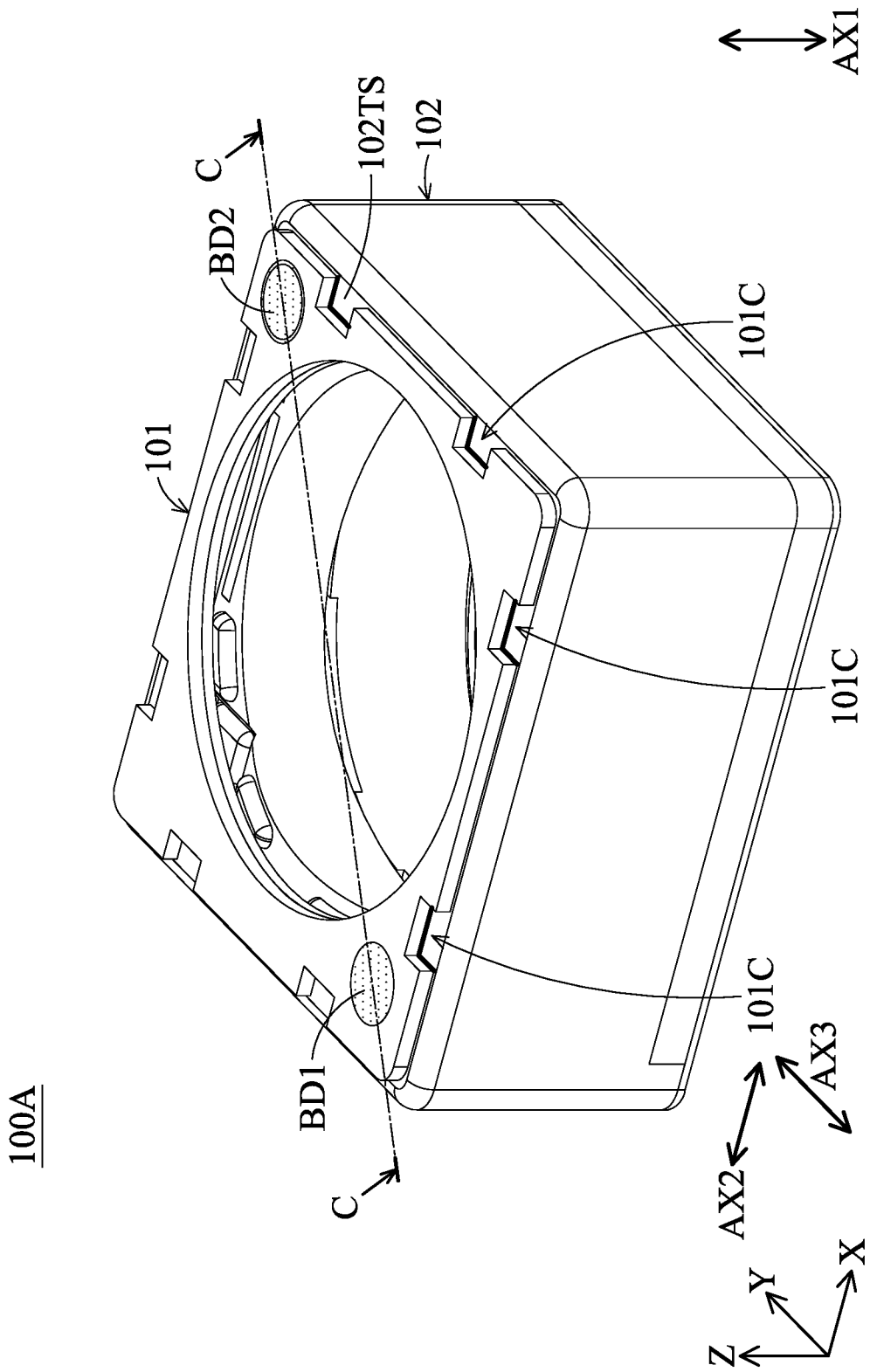
FIG. 9 is a perspective view of an optical element driving mechanism 100A according to another embodiment of the present disclosure.
Figure 10:
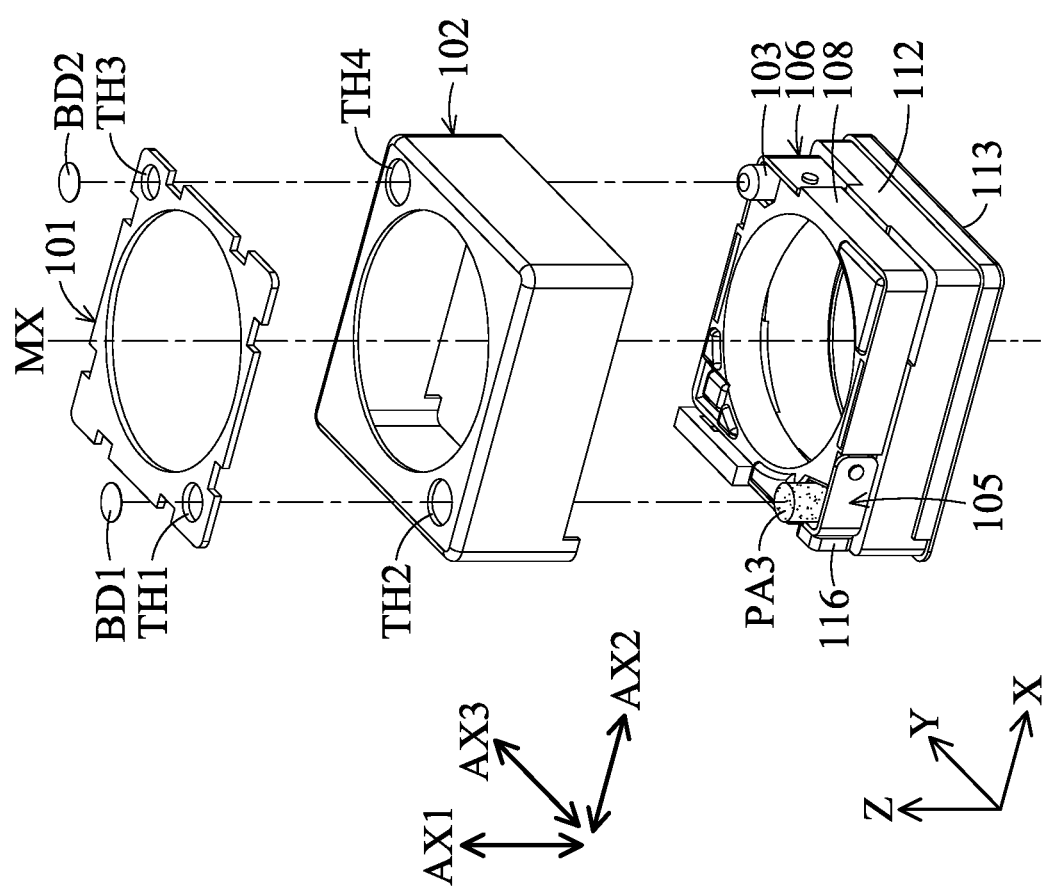
FIG. 10 is an exploded view of the optical element driving mechanism 100A according to another embodiment of the present disclosure.
Figure 11:
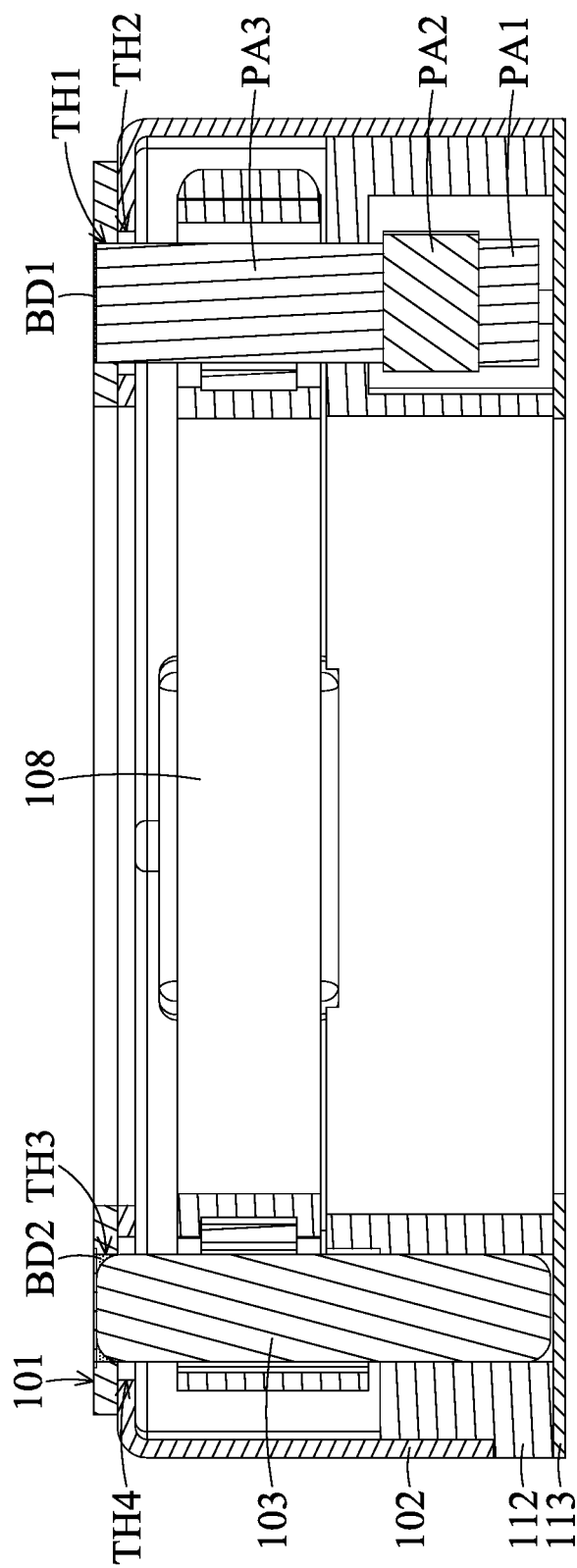
FIG. 11 is a cross-sectional view of the optical element driving mechanism 100A along line C-C in FIG. 9 according to another embodiment of the present disclosure.

Then please refer to FIG. 9 to FIG. 11. FIG. 9 is a perspective view of an optical element driving mechanism 100A according to another embodiment of the present disclosure, FIG. 10 is an exploded view of the optical element driving mechanism 100A according to another embodiment of the present disclosure, and FIG. 11 is a cross-sectional view of the optical element driving mechanism 100A along line C-C in FIG. 9 according to another embodiment of the present disclosure.

This embodiment is similar to the foregoing embodiment, so the configuration and functions of the same elements are not repeated herein. The difference between the two embodiments is that the optical element driving mechanism 100A further includes an upper cover 101 fixedly covering the casing 102, and the second guiding member 104 is omitted.

In this embodiment, the upper cover 101 and the casing 102 are made of metal, and the upper cover 101 is affixed to the casing 102 by laser welding technology. For example, a plurality of notches 101C is formed on the upper cover 101, and a top surface 102TS of the casing 102 corresponds to these notches 101C. The laser is applied on multiple sides of the notch 101C which are is in contact with the top surface 102TS (such as the thick lines in FIG. 9), so as to affix the upper cover 101 to the top surface 102TS. Based on such a design, the connection strength between the upper cover 101 and the casing 102 can be increased.

When viewed along the first axis AX1, the upper cover 101 covers a portion of the casing 102. When viewed along the first axis AX1, a portion of the casing 102 does not overlap the upper cover 101. That is, the area of the upper cover 101 is smaller than the area of the casing 102. Based on such a design, it can be ensured that when the optical element driving mechanism 100A falls, the upper cover 101 is not collided to cause damage to the driving member PA3.

In addition, compared with the foregoing embodiment, because the casing 102 in this embodiment is made of a metal material, the thickness of the casing 102 can be effectively reduced, thereby achieving the purpose of miniaturization.

In this embodiment, a first through hole TH1 is formed on the upper cover 101, and a second through hole TH2 is formed on the casing 102. The first through hole TH1 is aligned with the second through hole TH2, and the driving member PA3 passes through the first through hole TH1 and the second through hole TH2. It should be noted that the diameter of the first through hole TH1 is smaller than the diameter of the second through hole TH2. Moreover, the optical element driving mechanism 100 may further include a first bonding element BD1 disposed in the first through hole TH1 and configured to fix the driving member PA3.

Similarly, a third through hole TH3 is further formed on the upper cover 101, and a fourth through hole TH4 is further formed on the casing 102. The third through hole TH3 is aligned with the fourth through hole TH4, and the first guiding member 103 passes through the third through hole TH3 and the fourth through hole TH4. Likewise, the diameter of the third through hole TH3 is smaller than the diameter of the fourth through hole TH4.

Similarly, the optical element driving mechanism 100 may further include a second bonding element BD2 disposed in the third through hole TH3 and configured to fix the first guiding member 103. Based on the above structural design, the first guiding member 103 and the driving member PA3 can be positioned accurately, and the problem that the driving member PA3 is easily damaged when the optical element driving mechanism 100 is impacted can also be avoided.

In conclusion, the present disclosure provides an optical element driving mechanism including the driving assembly DA which includes the piezoelectric element PA2 and driving member PA3, and the piezoelectric element PA2 generates vibration so that the driving member PA3 drives the movable part 108 to move relative to the fixed assembly FA. The optical element driving mechanism 100 further includes a first guiding member 103 configured to guide the movable part 108. The driving member PA3 and the first guiding member 103 are arranged at opposite corners of the movable part 108 to avoid the movable part 108 from tilting during movement.

Furthermore, the driving member PA3 is held by the first elastic member 105 and the third elastic member 109, and the shock absorbing element 116 is disposed on the first elastic member 105. The shock absorbing element 116 can protect the first elastic member 105 when the optical element driving mechanism 100 is impacted, and it can also effectively reduce the noise when the driving member PA3 drives the movable part 108.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, comprising:
a fixed assembly;
a movable part, configured to be connected to an optical element and being movable relative to the fixed assembly;
a driving assembly, configured to drive the movable part to move relative to the fixed assembly, wherein the driving assembly includes a counterweight, a driving member, and a piezoelectric element fixedly connected between the counterweight and the driving member; and
a coupling assembly, wherein the movable part is movable relative to the fixed assembly by the coupling assembly; wherein
the optical element driving mechanism further includes a guiding assembly configured to guide the movable part along a first axis;
the guiding assembly includes a first guiding member which is affixed to the fixed assembly;
the first guiding member has a long strip-shaped structure extending along the first axis;
the coupling assembly includes a first elastic member and a second elastic member;
the first elastic member and the second elastic member each have a plate-shaped structure;
the first elastic member is affixed to the movable part;
the coupling assembly further includes a third elastic member and a fourth elastic member;

the third elastic member and the fourth elastic member each have a plate-shaped structure;

the third elastic member and the first elastic member are configured to be in contact with the driving member of the driving assembly to hold the driving member;

the fourth elastic member and the second elastic member are configured to be in contact with the first guiding member so as to hold the first guiding member;

when viewed along the first axis, the fourth elastic member has a fourth left-side portion, a fourth middle portion and a fourth right-side portion;

the fourth middle portion is connected between the fourth left-side portion and the fourth right-side portion;

the fourth left-side portion extends along a second axis;

the fourth right-side portion extends along a third axis;

the fourth left-side portion and the fourth right-side portion are configured to be in contact with the first guiding member;

the fourth middle portion does not contact the first guiding member;

when viewed along the first axis, the fourth middle portion overlaps a portion of the movable part.

2. The optical element driving mechanism as claimed in claim 1, wherein when viewed along the first axis, the driving assembly is located between the first elastic member and the movable part;

when viewed along the first axis, the first guiding member is located between the second elastic member and the movable part;

when viewed along the first axis, the driving assembly and the first guiding member are located at opposite corners of the movable part.

3. The optical element driving mechanism as claimed in claim 2, wherein when viewed along the first axis, the driving assembly is located between the third elastic member and the first elastic member;

when viewed along the first axis, the first guiding member is located between the fourth elastic member and the second elastic member.

4. The optical element driving mechanism as claimed in claim 3, wherein the first elastic member has a first width along the first axis;

the second elastic member has a second width along the first axis;

when viewed along the second axis or the third axis, the first width is less than the second width;

the first axis is perpendicular to the second axis and the third axis.

5. The optical element driving mechanism as claimed in claim 4, wherein when viewed along the first axis, the first elastic member has a first left-side portion, a first middle portion and a first right-side portion;

the first middle portion is connected between the first left-side portion and the first right-side portion;

the first left-side portion extends along the second axis;

the first right-side portion extends along the third axis;

the first left-side portion is affixed to the movable part by heat riveting;

the first right-side portion is configured to be in contact with the driving member.

6. The optical element driving mechanism as claimed in claim 4, wherein when viewed along the first axis, the second elastic member has a second left-side portion, a second middle portion and a second right-side portion;

the second middle portion is connected between the second left-side portion and the second right-side portion;

the second left-side portion extends along the second axis;

the second right-side portion extends along the third axis;

the second left-side portion and the second right-side portion are affixed to the movable part by heat riveting;

the second middle portion is configured to be in contact with the first guiding member.

7. The optical element driving mechanism as claimed in claim 6, wherein the optical element driving mechanism further includes a shock absorbing element fixedly disposed on the first right-side portion;

the shock absorbing element is made of a rubber material;

the fixed assembly includes a casing configured to surround the movable part;

when viewed along the first axis, the shock absorbing element is located between the first right-side portion and the casing.

8. The optical element driving mechanism as claimed in claim 7, wherein when viewed along the first axis, there is a first gap between the shock absorbing element and the casing;

when viewed along the first axis, there is a second gap between the movable part and the casing;

the first gap is equal to the second gap.

9. The optical element driving mechanism as claimed in claim 8, wherein when viewed along the first axis, the third elastic member has a third left-side portion, a third middle portion and a third right-side portion;

the third middle portion is connected between the third left-side portion and the third right-side portion;

the third left-side portion and the third right-side portion are not parallel to the second axis or the third axis;

the third left-side portion and the third right-side portion are configured to be in contact with the driving member;

the third middle portion does not contact the driving member;

when viewed along the first axis, the third middle portion overlaps a portion of the movable part.

10. The optical element driving mechanism as claimed in claim 9, wherein the fixed assembly further includes a base and a supporting frame;

the supporting frame forms an accommodating groove configured to accommodate a photosensitive assembly;

a photosensitive element is disposed on the photosensitive assembly and configured to receive an external light passing through the optical element.

11. The optical element driving mechanism as claimed in claim 10, wherein the supporting frame further forms a central opening that communicates with the accommodating groove, and the photosensitive element is disposed in the central opening;

the base is fixed between the supporting frame and the casing;

the driving member passes through the base, the movable part and the casing;

when viewed along the third axis, the driving member overlaps the base, the movable part and the casing;

the piezoelectric element is disposed in a first accommodating space of the base;

when viewed along the third axis, the counterweight is disposed in a second accommodating space of the supporting frame.

12. The optical element driving mechanism as claimed in claim 11, wherein the guiding assembly further includes a second guiding member affixed to the fixed assembly;

the second guiding member has a long strip-shaped structure extending along the first axis;

the second guiding member passes through the movable part, the casing and the base, so as to guide the movable part to move along the first axis.

13. The optical element driving mechanism as claimed in claim 12, wherein the casing is made of a plastic material;

the casing forms a first glue groove, a second glue groove and a third glue groove;

the first glue groove is communicated with the second glue groove and the third glue groove;

the optical element driving mechanism further includes a first adhesive element disposed in the first glue groove;

a portion of the first adhesive element is disposed in the second glue groove and configured to fix the driving member;

a portion of the first adhesive element is disposed in the third glue groove and configured to fix the second guiding member;

the optical element driving mechanism further includes a second adhesive element disposed in the first accommodating space and the second accommodating space and configured to fix the counterweight;

hardness of the first adhesive element is greater than hardness of the second adhesive element.

14. The optical element driving mechanism as claimed in claim 11, wherein the optical element driving mechanism further includes an upper cover fixedly covering the casing;

the upper cover and the casing are made of metal;

the upper cover is affixed to the casing by laser welding technology;

the upper cover covers a portion of the casing;

when viewed along the first axis, a portion of the casing does not overlap the upper cover.

15. The optical element driving mechanism as claimed in claim 14, wherein a first through hole is formed on the upper cover, and a second through hole is formed on the casing;

the first through hole is aligned with the second through hole;

the driving member passes through the first through hole and the second through hole;

a diameter of the first through hole is smaller than a diameter of the second through hole;

the optical element driving mechanism further includes a first bonding element disposed in the first through hole and configured to fix the driving member.

16. The optical element driving mechanism as claimed in claim 15, wherein a third through hole is formed on the upper cover, and a fourth through hole is formed on the casing;

the third through hole is aligned with the fourth through hole;

the first guiding member passes through the third through hole and the fourth through hole;

a diameter of the third through hole is smaller than a diameter of the fourth through hole;

the optical element driving mechanism further includes a second bonding element disposed in the third through hole and configured to fix the first guiding member.

17. The optical element driving mechanism as claimed in claim 8, wherein the second width is at least one-third of a movable stroke of the movable part along the first axis;

the fixed assembly includes a base fixedly connected to the casing;

the base has an accommodating notch concaved along the first axis;

the accommodating notch is configured to accommodate a portion of the second elastic member.

18. The optical element driving mechanism as claimed in claim 17, wherein when viewed along the first axis, a first interval is formed between the second left-side portion and the movable part;

when viewed along the first axis, a second interval is formed between the second right-side portion and the movable part;

the first interval is not equal to the second interval.

* * * * *